(12) United States Patent
Smith

(10) Patent No.: US 7,069,329 B2
(45) Date of Patent: Jun. 27, 2006

(54) SYSTEMS AND METHODS FOR PROVIDING A VOLUMETRIC-BASED NETWORK ACCESS

(75) Inventor: Mark Smith, Carmel, CA (US)

(73) Assignee: Movedigital, Inc., Carmel, CA (US)

( * ) Notice: Subject to any disclaimer, the term of this patent is extended or adjusted under 35 U.S.C. 154(b) by 220 days.

(21) Appl. No.: 10/455,230

(22) Filed: Jun. 4, 2003

(65) Prior Publication Data

US 2004/0249941 A1 Dec. 9, 2004

(51) Int. Cl.
*G06F 15/173* (2006.01)
(52) U.S. Cl. .................. 709/227; 709/219; 455/404
(58) Field of Classification Search ............... 709/200, 709/223–227, 219; 705/14, 10, 40, 39; 370/352; 455/404
See application file for complete search history.

(56) References Cited

U.S. PATENT DOCUMENTS

| | | | |
|---|---|---|---|
| 6,405,251 B1 * | 6/2002 | Bullard et al. ............... | 709/224 |
| 6,625,257 B1 * | 9/2003 | Asaoka et al. ............ | 379/88.01 |
| 6,909,708 B1 * | 6/2005 | Krishnaswamy et al. ... | 370/352 |
| 2002/0174227 A1 * | 11/2002 | Hartsell et al. .............. | 709/226 |
| 2003/0125013 A1 * | 7/2003 | Mizell et al. ................ | 455/408 |
| 2004/0077332 A1 * | 4/2004 | Ephraim et al. ............ | 455/405 |
| 2004/0228277 A1 * | 11/2004 | Williams .................... | 370/230 |

OTHER PUBLICATIONS

"Giganews-Broadband Service for ISPs", http://web.archive.org/web/*/http://www.giganews.com/, Mar. 7, 2000.*
"Giganews-Broadband Service for ISPs", http://web.archive.org/web/*/http://www.giganews.com/, Mar. 22, 2003.*

* cited by examiner

*Primary Examiner*—Jeffrey Pwu
(74) *Attorney, Agent, or Firm*—Townsend and Townsend and Crew LLP

(57) ABSTRACT

A method of providing network access includes receiving a request from a customer to use a volume of network access and establishing an account in favor of the customer for the volume of network access. The method also includes monitoring the transfer of a volume of information. The volume of information is capable of being expressed in the units of the volume of network access. The method also includes adjusting the account of the customer in relation to the volume of information.

18 Claims, 7 Drawing Sheets

FIG. 4A

File Hosting
Basic Info

Name of Asset *  [____] 402
Company Name  [____] 404
Promotional URL for Asset  [____] 406
Short Description *
Price (in US$) *  [_Free Download_]
Version

[Cancel] [Continue]

* Required

400

Home | Your Account | Add File | Add Store | Add Collection
Your Files | Your Store | Your Collections | Help | Company | Terms | About

SYSTEMS AND METHODS FOR PROVIDING A VOLUMETRIC-BASED NETWORK ACCESS

BACKGROUND OF THE INVENTION

The present invention relates generally to electronic communication. More specifically, the present invention relates to systems and methods for providing network access.

Electronic communication, for most people, is possible only through the assistance of companies that allow individuals to utilize their networks, usually for a fee. Heretofore, customers have compensated such companies according to the amount of bandwidth the customers utilize (i.e., the amount of information the customers transfer within a given period of time). Such methods, however, may be unfair to customers having high instantaneous information flow rates, yet low total volume of information transferred. Thus, systems and methods are needed for providing network access based on the amount of information sent, rather than the rate at which the information is sent.

BRIEF SUMMARY OF THE INVENTION

Embodiments of the invention thus provide a method of providing network access. The method includes receiving a request from a customer to use a volume of network access and establishing an account in favor of the customer for the volume of network access. The method also includes monitoring the transfer of a volume of information. The volume of information is capable of being expressed in the units of the volume of network access. The method also includes adjusting the account of the customer in relation to the volume of information.

In some embodiments, the volume of network access is a multiple of bits. Monitoring the transfer of a volume of information may include monitoring the size of a file as it flows through an interface. The interface may include a portion of a network. The interface may include a selection from the group consisting of router, modem, switch, load balancer, and server. The method also may include receiving a request from the customer to host a file and storing a file size of the file in a database. The transfer of a volume of information may include receiving a request to send the file to a requester and consulting the database to determine the file size. Adjusting the account of the customer in relation to the volume of information may include determining if the information is transferred successfully and adjusting the account of the customer only if the information is transferred successfully. The method may include, in response to a request from the customer, displaying a visual representation of the account. The visual representation may be in the form of a gas tank gauge. Adjusting the account of the customer may result in a balance, in which case the method may include sending an email to the customer when the balance falls below a predetermined threshold. The predetermined threshold may be calculated as a multiple of a specific file's size.

In still other embodiments, a system for providing network access includes a host computer system and a communication arrangement configured to enable the host computer system to communicate with at least one other computing device. The host computer system is programmed to receive a request from a customer to use a volume of network access and establish an account in favor of the customer for the volume of network access. The host computer system is further programmed to monitor the transfer of a volume of information. The volume of information is capable of being expressed in the units of the volume of network access. The host computer system is further programmed to adjust the account of the customer in relation to the volume of information.

In some embodiments of the system, the volume of network access is a multiple of bits. The may include a monitoring arrangement configured to determine the size of a file as it flows through an interface. The host computer system may be further programmed to receive a request from the customer to host a file and store a file size of the file in a database. The host computer system may be further programmed to receive a request to send the file to a requestor and consult the database to determine the file size. The host computer system may be further programmed to determine if the information is transferred successfully and adjust the account of the customer only if the information is transferred successfully. The host computer system may be further programmed to, in response to a request from the customer, display a visual representation of the account to the customer in the form of a gas tank gauge. Adjusting the account of the customer may results in a balance in which case the host computer system may be further programmed to send an email to the customer when the balance falls below a predetermined threshold. The predetermined threshold may be calculated as a multiple of a specific file's size.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIGS. 4A–4E illustrate a series of display screens in an embodiment of the invention.

DETAILED DESCRIPTION OF THE INVENTION

Figure 1:
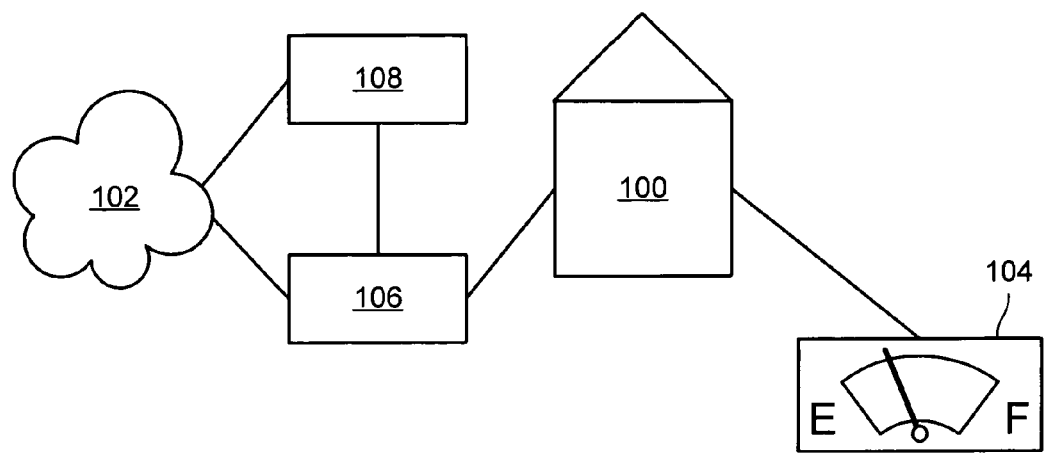
FIG. 1 illustrates an embodiment of the present invention relating to providing network access.

Embodiments of the invention provide systems and methods for tracking the utilization by one party (hereinafter "customer") of network resources controlled or operated by another (hereinafter "provider"). The tracking may be for purposes of compensation, for example, wherein a customer pays a telecommunication company a fee for using its network. In another non-limiting example, a customer desirous of publicly distributing a file may pay a file hoster to host the file so that others can find and download it. The tracking also may be for other purposes, such as simply measuring resource utilization. Other examples are possible.

Network resources may comprise any of a variety of well known network resources. For example, network resources may comprise transportation media such as wired or wireless connections, including fiber optic, copper, radio frequency, microwave, and the like. Network resources may comprise various types of storage systems, such as, for example, file servers, database servers, web servers, domain name servers, and the like, any of which may comprise optical, magnetic, solid state, or other types of storage. Other examples are possible. In short, "network resources" may comprise any network component or group of components.

According to embodiments of the present invention, network utilization is determined by the total volume of information transported through or stored on network resources of the provider by the customer. This may be determined, for example, by measuring the total amount of information that flows through an interface. This also may be determined by summing the known sizes of all files transported through or stored by the network resource. Other examples are possible. In any case, the network utilization is based on quantity (e.g., volume) of information. The information quantity may be expressed, for example, in bits or bytes, or any multiple thereof, such as megabits. These examples are understood to be non-limiting.

In a specific embodiment of the invention, a customer acquires a quantity of network access from the provider. The quantity may be contemplated as a "gas tank" of network utilization. As the customer utilizes the network, the gas tank is decremented based on the quantity of information that is moved through the network by the customer or on account of the customer. In some embodiments, the gas tank is only decremented when the information is successfully transported.

The quantity of information may be measured in any of a number of ways. For example, the information that passes through a network component or a network interface (e.g., a router) may be monitored. This may be applied, for example, to a residential customer of a telecommunication service provider. If a customer desires Internet access at home, rather than paying the provider for a specific bandwidth of access (i.e., quantity per unit of time, or flow rate), the customer may pay based on the volume of information (e.g., megabits) that the customer downloads. The provider may monitor the switch or modem that services the customer's residence to sum the total amount of such information.

In another example, the sizes of all files comprising the information may be stored in a database. Whenever a file is transported on account of the customer, the customer's gas tank may be debited an about equal to the file size. This may be applied, for example, to a file hosting services provider.

If a customer's tank falls below a predetermined threshold, then customer may be alerted that his "reserve tank" has been reached. The alert may be an email. The reserve tank may be calculated as a multiple of a file size. If the customer's tank becomes empty, then the customer may receive an alert that files cannot be transferred on his account until he fills his tank.

Having described embodiments of the invention generally, attention is directed to FIG. 1, which illustrates an embodiment of the invention. In the example of FIG. 1, a residential customer 100 wishes to utilize the network resources 102 of a provider (e.g., a telecommunication service provider). The customer purchases a gas tank 104 from the provider. The gas tank represents a total quantity of network utilization (e.g., 100 gigabits of information either uploaded or downloaded). The customer 100 accesses the network resources 102 via a network interface 106, which may be any network resource, including such things as a switch or modem that services the customer's residence. The provider monitors the network resource using a monitoring device 108 capable of measuring the quantity of information that flows from the customer to the network or from the network to the customer. As information flows, the customer's gas tank 104 is decremented according to the total quantity of information that flows. In some examples, the provider also monitors whether the information flows successfully and only decrements the customer's tank if the information flows successfully. The customer may view a visual representation of his gas tank, for example by accessing a web site. If the tank gets low, the provider may alert the customer, for example by sending the customer an email. The customer then may refill his tank or wait until the tank is empty.

Figure 2:
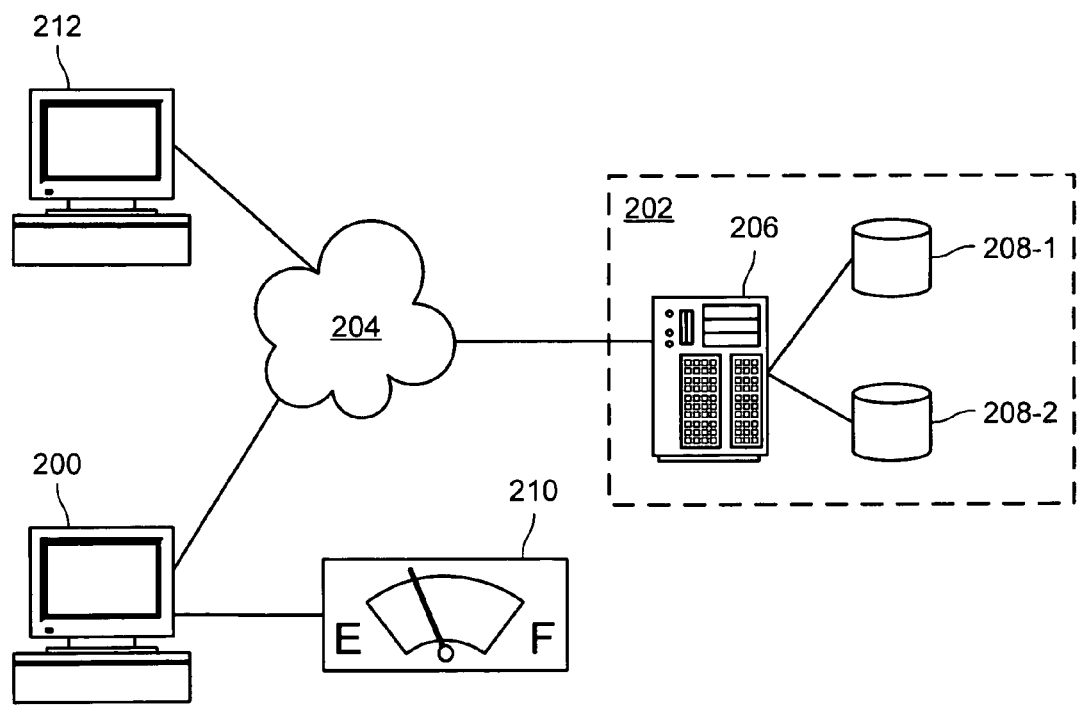
FIG. 2 illustrates an embodiment of the invention relating to file hosting.

Attention is directed to FIG. 2, which illustrates another embodiment of the invention. In this embodiment, a customer 200 desires to have information hosted by a provider 202. The information may be a web site comprising many files. The information also may be a single file that the customer desires to distribute. Many other examples are possible. The customer 200 communicates with the provider 202 via a network 204, which may comprise any network, including wired and wireless networks, optical, electrical, RF, or microwave networks, virtual private networks, wide area networks, local area networks, the Internet, and/or the like. The provider 202 may comprise one or more computing devices 206 and one or more storage systems 208. The computing device 206 may be any of a number of well known computing devices such as, for example, a server computer, a work station, a mainframe computer, a desk top computer, a lop top computer, and/or the like. The storage systems 208 may be any of a number of well known storage systems, such as, for example, database servers, web servers, file servers, optical storage systems, magnetic storage systems, and/or the like. In a specific embodiment, the storage systems 208 comprise a file server 208-1 and a database server 208-2. Those skilled in the art will recognize many alternative embodiments, including an embodiment wherein the provider comprises a single computing device having an integral storage arrangement.

In this example, the customer 200 acquires a gas tank 210 from the provider 202. The customer then uploads files to the provider that are stored at a file server 208-1. In addition, each file's size is stored at a database server 208-2. Thereafter, the files are available to be downloaded by other users 212. As the customer's files are downloaded, the customer's gas tank 210 is decremented. This is accomplished by accessing the database server 208-2 to determine the file's size and subtracting the size from the tank 210. In some embodiments, the tank is decremented only when a file is transferred successfully. The customer may receive an alert, such as, for example, an email, when his tank reaches a predetermined level. Those skilled in the art will recognize many other possible embodiments in light of this disclosure.

Figure 3:
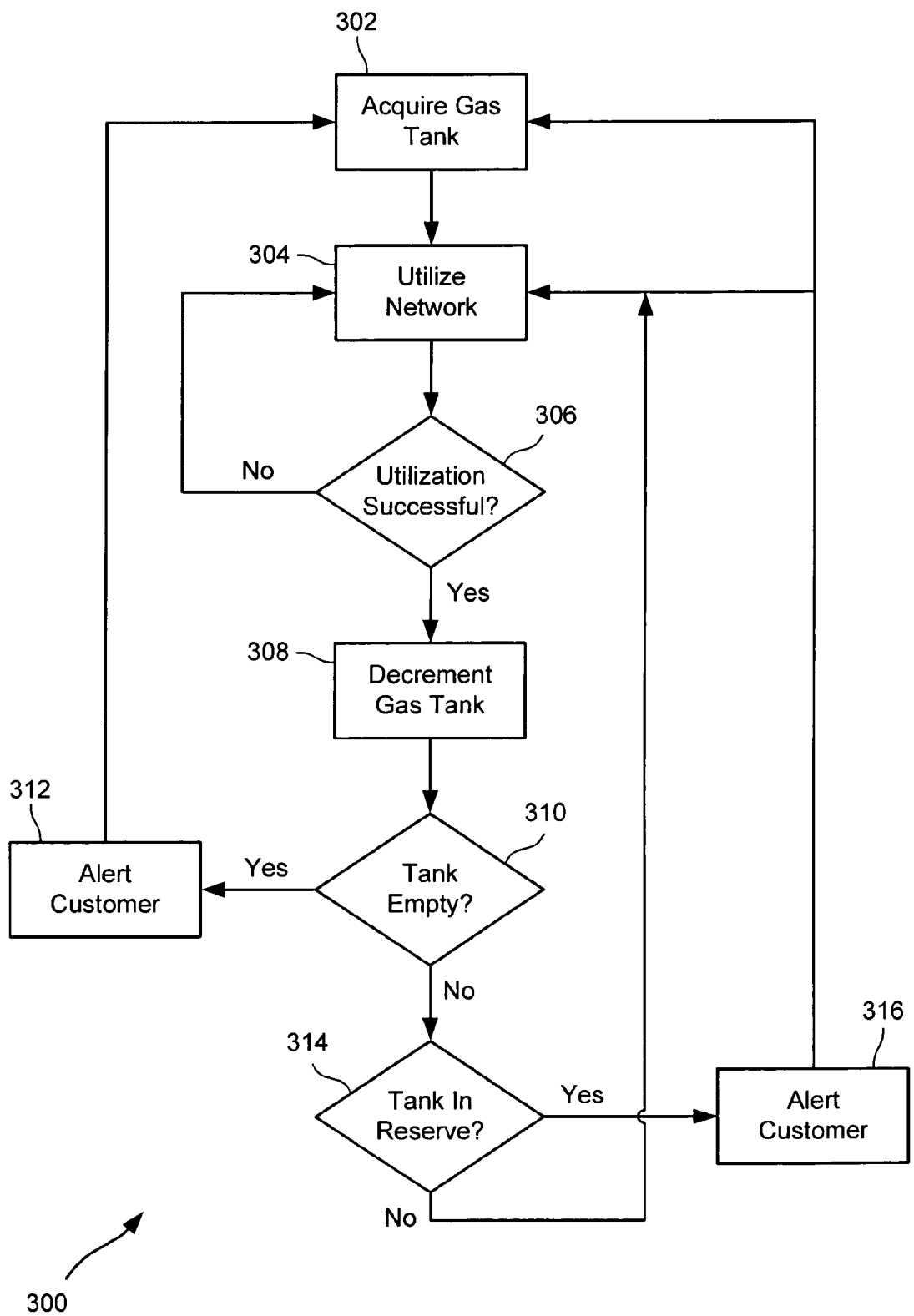
FIG. 3 illustrates a method according to an embodiment of the present invention that may be implemented in either of the embodiments of FIG. 1 or FIG. 2.

Attention is directed to FIG. 3, which illustrates an exemplary method 300 according to embodiments of the invention. The method 300 may be implemented in either of the previously-described embodiments or other suitable system. The method includes acquiring a gas tank at block 302. The gas tank represents a total quantity of network utilization that a customer acquires from a provider. The customer may access a visual representation of his tank, for example, by accessing a web site that displays the customer's tank. In some embodiments, a customer acquires one tank per file the customer wishes to host at the provider's file hosting site. In such cases, block 302 may include uploading a file to the provider's file hosting site. In another embodiment, the customer acquires a single gas tank for all his needs. The needs may include, for example, Internet access, web site hosting, multiple file hostings, and/or the like.

At block 304, the customer utilizes the network and/or others utilize the network on the customer's account. For example, the customer may access a telecommunication network operated by the provider. In another example, a network user may locate a file of the customer at the provider's file hosting site and download the file. The network usage for downloading the file would then be debited from the customer's gas tank as will be described.

At block 306, a determination is made whether the utilization of the network was successful. In some examples, this comprises determining that a file was downloaded successfully. If the network utilization was not successful, then the method continues back at block 304. In the network utilization was successful, then the method continues at block 308.

At block 308, the customer's gas tank is decremented the amount by which the network was utilized. As discussed previously, this comprises deducting from the customer's tank an amount equivalent to the quantity of information transferred. In some examples, this comprises monitoring the amount of information that flows through an interface. In other examples, this comprises consulting a database to determine the size of any files downloaded or exchanged on the customer's account. Other examples are possible.

At block 310, a determination is made whether the customer's tank is empty, i.e., whether a total quantity of information equaling or exceeding the customer's tank size has been moved through the network. If so, the customer is alerted at block 312 that his tank is empty. This may comprise, for example, sending the customer an email, flashing a "warning light" on a visual representation of the customer's gas tank when the customer accesses such information, and the like. Many other examples are possible. Following the alert, the customer may acquire another tank at block 302, which may comprise adding gas to his existing tank. If the customer's tank is not empty, then the method continues at block 314.

At block 314, a determination is made whether the customer's tank has reached his "reserve tank," a predetermined threshold that signifies that the customer has a limited amount of network utilization remaining. In some examples, this is calculated as a specified number of downloads of a specific file. In a file download embodiment, the reserve tank my be established at the 100 megabyte level to signify 10 downloads of a 10 megabyte file. Other examples are possible. If the reserve tank has been reached, the customer may be alerted at block 316. This may comprise sending the customer an email, flashing a warning on a visual representation of the customer's gas tank, indicating the needle of the gas tank in a "red" area on the gas tank gauge, and/or the like. Many other examples are possible. After the reserve level is reached and the customer is alerted, the customer may acquire another gas tank (which may comprise "filling" his existing tank) back at block 302 or continue utilizing the network back at block 304. If the tank has not yet reached the reserve level, then the method may continue back at block 304. Of course, although not shown explicitly, a customer may acquire one or more gas tanks or fill existing gas tanks at any point in the process. In fact, the method 300 is to be understood as exemplary. The blocks may be traversed in different orders, blocks may be added, blocks may be removed, and the like, as those skilled in the art will realize.

Attention is now directed to FIGS. 4A–E, which illustrate a series of display screens that may be used in a specific embodiment of the invention relating to file hosting. Using such display screens (although not every feature is presented herein), a customer may create an account at a provider's site, upload one or more files, organize the files, acquire one or more gas tanks, and allow others to download the one or more files on the customer's account. The display screens may appear in a web browser environment, as is known.

FIG. 4A illustrates an asset creation screen 400. Using this screen, the customer enters information relating to a file the customer desires to host at the file hoster's site. The customer enters the name of the file 402, a description of the file 404, and the price of the file 406. Other information may be entered, but is not necessary.

Figure 4B:
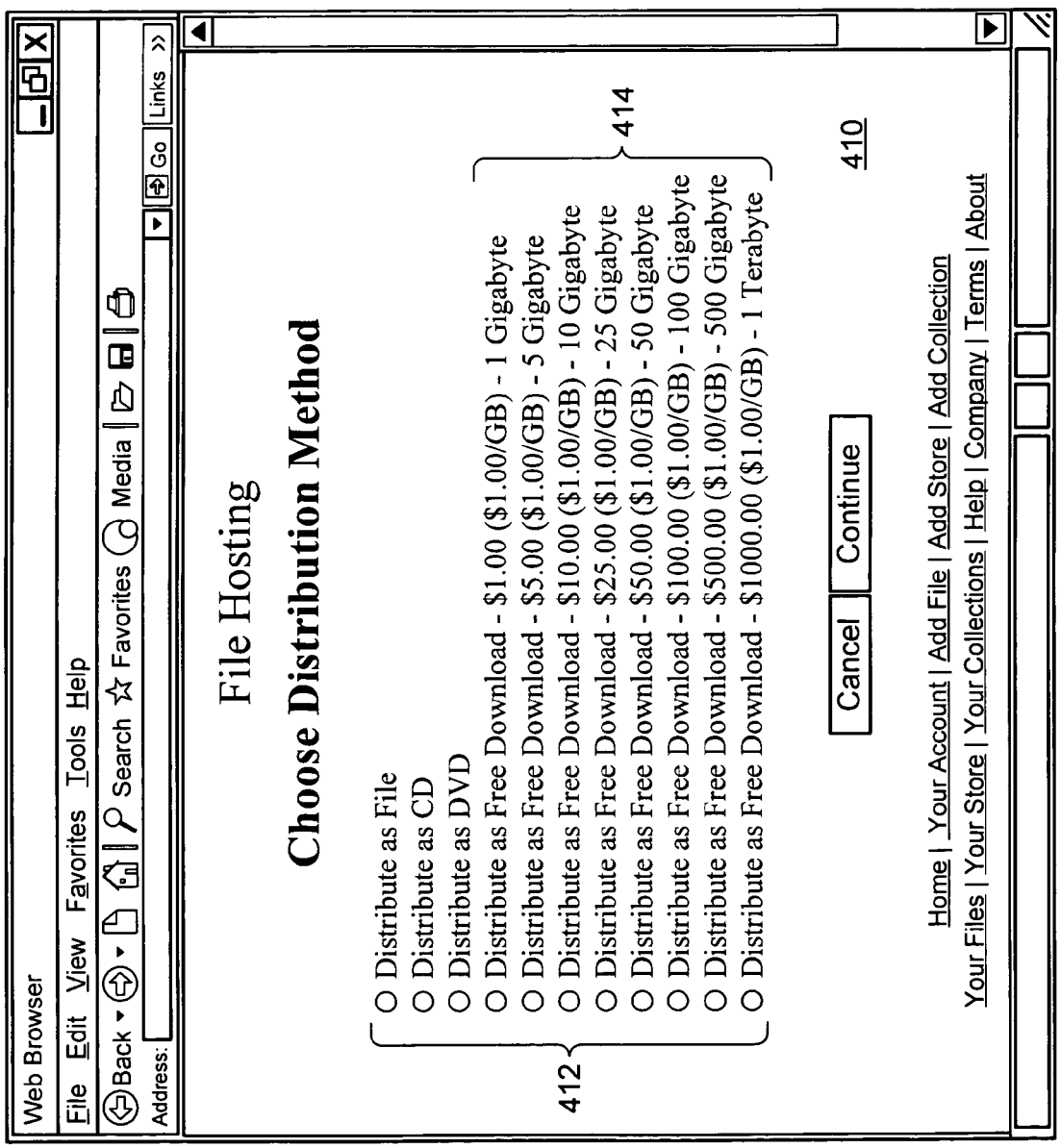

FIG. 4B illustrates a distribution method selection screen 410. The customer may select, from a list of selections 412, how the customer desires to make the asset available to others. The bottom eight selections 414 amount to the purchase of a gas tank for the file. Thus, the customer is paying the file hoster to send the file to requesters, and the customer is pre-paying the file hoster for utilizing the hoster's resources based on the volume of usage.

Figure 4C:
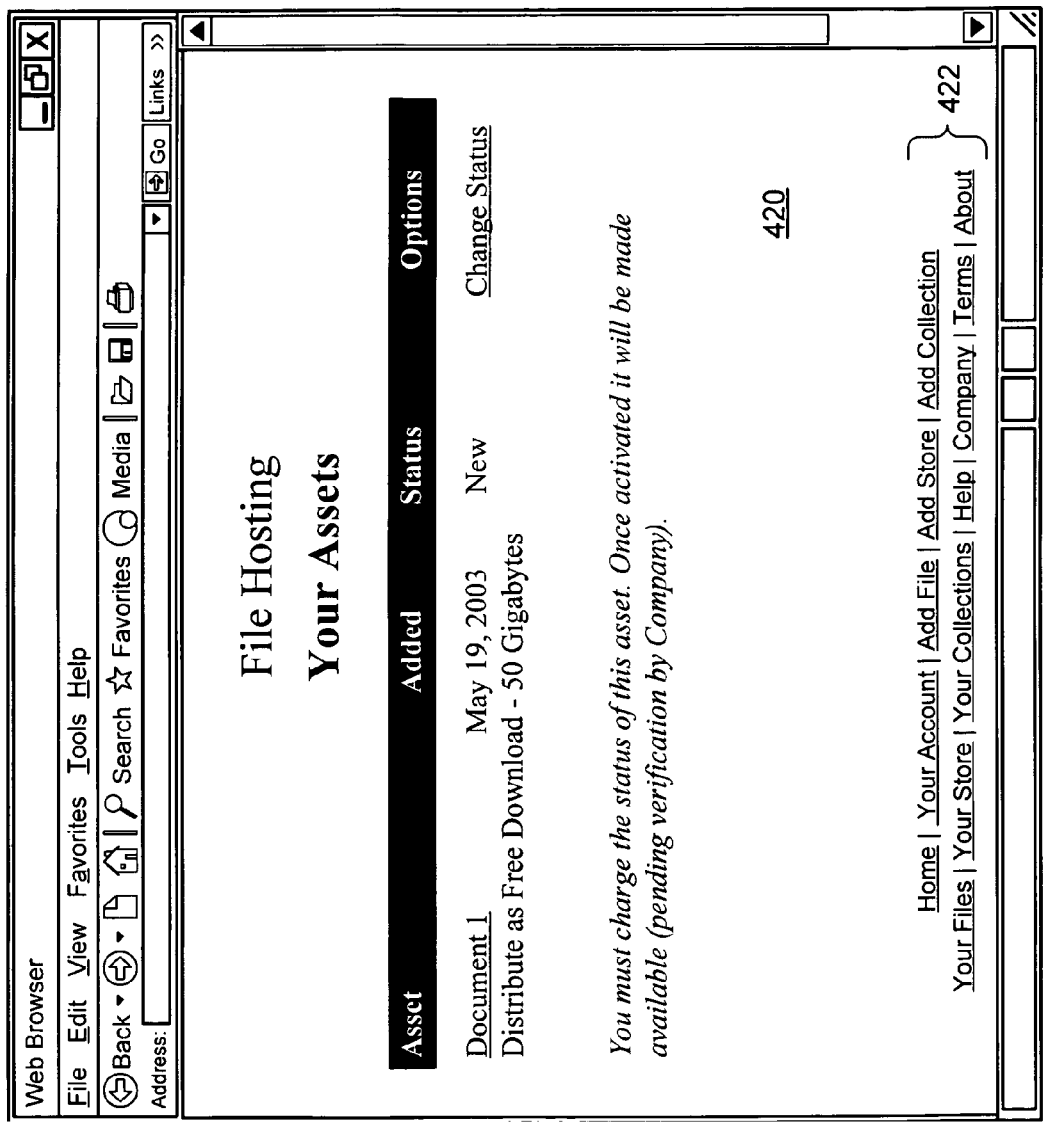

Once uploaded, the customer's assets appear on an "assets" screen 420 of FIG. 4C. Using the links 422, the customer may organize his assent into groups, such as stores and/or collections.

Figure 4D:
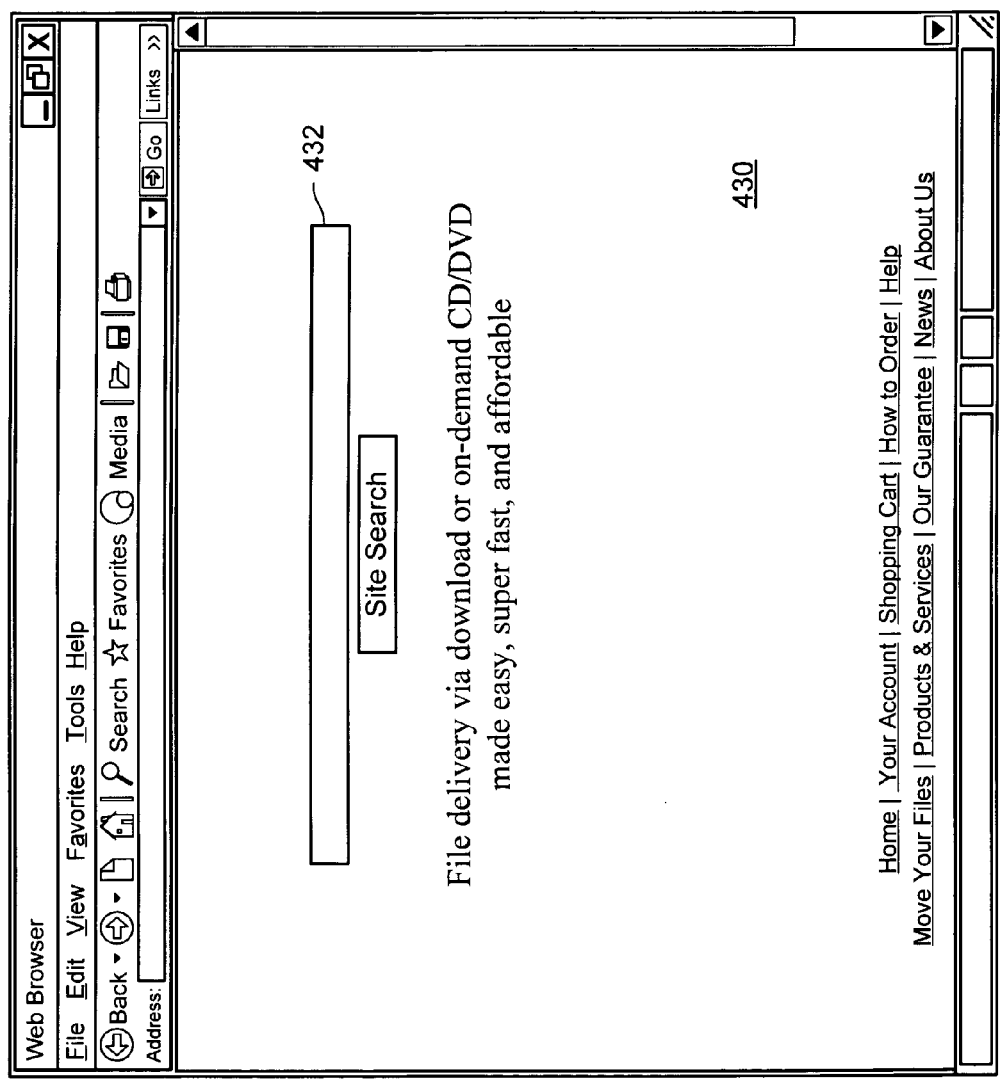
Figure 4E:
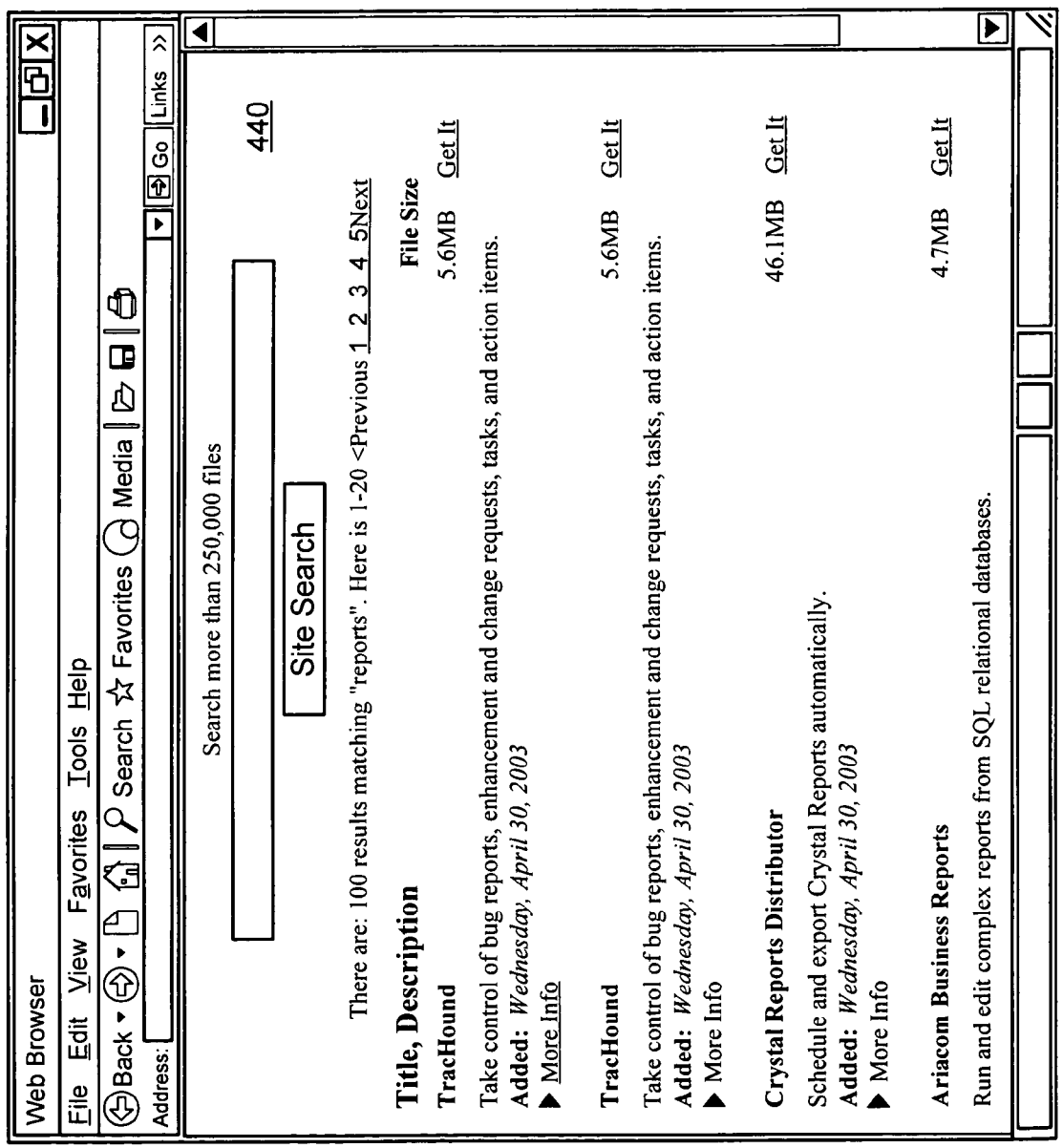

Others then may search the files hosted by the file hoster's site using the search screen 430 of FIG. 4D. The searcher enters a key word or phrase in the search block 432. In response, a list of files containing the key word appear in a "results" screen 440, as shown in FIG. 4E. Then, using a shopping cart model, for example, the searcher may select files to download. The network utilization required to accomplish the download may be deducted from the customer's gas tank, if his file is selected.

It should be understood that the display screens pictured in FIGS. 4A–4E are exemplary and those skilled in the art will realize alternative embodiments.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to either file hosting or Internet access. For example, the present invention may be used to provide network access for other purposes such as web site hosting, and the like. Accordingly, the above description should not be taken as limiting the scope of the invention, which is defined in the following claims.

What is claimed is:

1. A method of providing access to information via a network, comprising:
   at a host computer system, receiving a request from a customer to transfer a volume of information via the network, wherein the volume of information is in terms of bits of information;
   at the host computer system, establishing an account in favor of the customer for the volume of information;
   thereafter, monitoring the transfer of information by the customer via the network without measuring a data flow rate, wherein the information is in terms of bits;
   determining whether the information was successfully transferred;
   if successful, determining a size of the information; and
   decrementing the account based on the size such that the account has a smaller volume of information available for subsequent transfers;

in response to a request from the customer, displaying a visual representation of the account such that it shows a balance.

2. The method of claim 1, wherein the volume of information is expressed in units selected from the group consisting of bits, bytes, kilobytes, kilobits, megabytes, megabits, gigabytes, gigabits, terabytes, terabits, yottabytes, and yottabits.

3. The method of claim 1, wherein monitoring the transfer of information comprises monitoring the size of a file as it flows through an interface.

4. The method of claim 3, wherein the interface comprises a portion of the network.

5. The method of claim 3, wherein the interface comprises a selection from the group consisting of router, modem, switch, load balancer, and server.

6. The method of claim 1, further comprising:
receiving a request from the customer to host a file; and
storing a file size of the file in a database.

7. The method of claim 6, wherein monitoring the transfer of information comprises:
receiving a request to send the file to a requestor; and
consulting the database to determine the file size.

8. The method of claim 1, wherein decrementing the account based on the size results in a balance, the method further comprising, sending an email to the customer when the balance reaches a predetermined threshold.

9. The method of claim 8, wherein the predetermined threshold is calculated as a multiple of a specific file's size.

10. A system for providing network access, comprising:
a host computer system; and
a communication arrangement configured to enable the host computer system to communicate with at least one other computing device;
wherein the host computer system is programmed to:
receive a request from a customer to transfer a volume of information via a network;
establish an account in favor of the customer for the volume of information;
monitor the transfer of information by the customer via the network without measuring a data flow rate, wherein the information is in terms of bits;
determine whether the information was successfully transferred;
if successful, determining a size of the information by accessing a database having the size; and
decrementing the account based on the size such that the account has a smaller volume of information available for subsequent transfers and visually displaying a balance.

11. The system of claim 10, wherein the volume of information is expressed in units selected from the group consisting of bits, bytes, kilobytes, kilobits, megabytes, megabits, gigabytes, gigabits, terabytes, terabits, yottabytes, and yottabits.

12. The system of claim 10, further comprising a monitoring arrangement configured to determine the size of a file as it flows through an interface.

13. The system of claim 10, wherein the host computer system is further programmed to:
receive a request from the customer to host a file; and
store a file size of the file in a database.

14. The system of claim 13, wherein the host computer system is further programmed to:
receive a request to send the file to a requestor; and
consult the database to determine the file size.

15. The system of claim 10, wherein the host computer system is further programmed to, in response to a request from the customer, display a visual representation of the account to the customer in the form of a gas tank gauge.

16. The system of claim 10, wherein decrementing the account based on the size results in a balance and the host computer system is further programmed to send an email to the customer when the balance reaches below a predetermined threshold.

17. The system of claim 16, wherein the predetermined threshold is calculated as a multiple of a specific file's size.

18. A method of providing access to information via a network, comprising:
at a host computer system, receiving a request from a customer to transfer a volume of information via the network, wherein the volume of information is in terms of bits of information;
at the host computer system, establishing an account in favor of the customer for the volume of information;
thereafter, monitoring the transfer of information by the customer via the network without measuring a data flow rate, wherein the information is in terms of bits; and
determining whether the information was successfully transferred;
if successful, determining a size of the information;
decrementing the account based on the size such that the account has a smaller volume of information available for subsequent transfers; and
wherein decrementing the account based on the size results in a balance, the method further comprising, sending a notification to the customer when the balance reaches a predetermined threshold.

* * * * *